United States Patent
Zhou et al.

(10) Patent No.: US 11,477,569 B2
(45) Date of Patent: Oct. 18, 2022

(54) APPARATUS AND METHOD FOR OBTAINING DIRECTIONAL AUDIO SIGNALS

(71) Applicant: Cirrus Logic International Semiconductor Ltd., Edinburgh (GB)

(72) Inventors: Dayong Zhou, Austin, TX (US); Brad Zwernemann, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 0 days.

(21) Appl. No.: 17/205,352

(22) Filed: Mar. 18, 2021

(65) Prior Publication Data
US 2022/0303673 A1 Sep. 22, 2022

(51) Int. Cl.
| | |
|---|---|
| H04R 5/00 | (2006.01) |
| H04R 1/40 | (2006.01) |
| H04R 3/00 | (2006.01) |
| G06F 17/14 | (2006.01) |
| H04R 29/00 | (2006.01) |

(52) U.S. Cl.
CPC ............. *H04R 1/406* (2013.01); *G06F 17/14* (2013.01); *H04R 3/005* (2013.01); *H04R 29/004* (2013.01); *H04R 2201/40* (2013.01); *H04R 2430/23* (2013.01)

(58) Field of Classification Search
CPC ...... H04R 1/406; H04R 3/005; H04R 29/004; H04R 2201/40; H04R 2430/23; G06F 17/14

USPC .......................................................... 381/92
See application file for complete search history.

(56) References Cited

U.S. PATENT DOCUMENTS

| | | | |
|---|---|---|---|
| 6,272,226 B1 | 8/2001 | Khan et al. | |
| 2003/0092406 A1 | 5/2003 | Ito et al. | |
| 2007/0047742 A1* | 3/2007 | Taenzer | H04R 29/006 |
| | | | 381/92 |

FOREIGN PATENT DOCUMENTS

JP H05168085 A 7/1993

OTHER PUBLICATIONS

Combined Search and Examination Report under Sections 17 and 18(3), UKIPO, Application No. GB2200549.0, dated Mar. 18, 2022.

* cited by examiner

*Primary Examiner* — Ammar T Hamid
(74) *Attorney, Agent, or Firm* — Jackson Walker L.L.P.

(57) ABSTRACT

A method of obtaining a directional microphone signal, the method comprising: receiving first and second microphone signals from first and second microphones separated by a distance; obtaining a combined microphone signal based on one or more of the first and second microphone signals; obtaining a difference microphone signal by subtracting the second microphone signal from the first microphone signal; obtaining a transformed combined microphone signal by applying a Hilbert transform to the combined microphone signal; combining the transformed combined microphone signal with the difference microphone signal to obtain the directional microphone signal.

20 Claims, 8 Drawing Sheets

APPARATUS AND METHOD FOR OBTAINING DIRECTIONAL AUDIO SIGNALS

TECHNICAL FIELD

The present disclosure relates to apparatus and methods for obtaining directional audio signals, in particular directional audio signals.

BACKGROUND

Consumer communications devices, such as smartphones, tablets and computers, typically comprise an array of spaced apart microphones used to capture speech for phone and video calls and to record audio. Such microphones are typically omni-directional meaning that they pick up sound with equal gain regardless of direction of incidence. However, due to their spacing, signals derived from these microphones can be processed to obtain a directional signal which represents sound received from a particular direction relative to the microphone array. In doing so, background noise from other directions can be suppressed, improving audio quality.

Known directional multi-microphone systems utilise a variable delay element to obtain directional signals. In a two-microphone example, a delay is applied to the signal from one of the microphones which is equal to the time taken for sound to travel a distance d from one microphone to the other. A drawback of such systems is the requirement to implement fraction delay approximation to calculate the delay, which can be processor intensive. In addition, to change the direction of focus of the beam, e.g. from front to rear, fractional delay instead needs to be added to the other microphone in the pair, leading to increased processing complexity.

SUMMARY

According to a first aspect of the disclosure, there is provided a method of obtaining a directional microphone signal, the method comprising: receiving first and second microphone signals from first and second microphones separated by a distance; obtaining a combined microphone signal based on one or more of the first and second microphone signals; obtaining a difference microphone signal by subtracting the second microphone signal from the first microphone signal; obtaining a transformed combined microphone signal by applying a Hilbert transform to the combined microphone signal; combining the transformed combined microphone signal with the difference microphone signal to obtain the directional microphone signal.

Obtaining the combined microphone signal may comprise: summing the first and second signals.

The method may further comprise applying a delay to the difference microphone signal prior to the combining. The delay may be equal to a delay associated with obtaining the transformed combined signal.

Obtaining the transformed combined microphone signal may further comprise applying a gain adjustment to the combined microphone signal.

Applying the gain adjustment may comprise applying a frequency independent gain to the transformed combined microphone signal. For example, frequency independent gain may be applied in the time domain.

Applying the gain adjustment may comprise applying a frequency dependent gain. For example, the frequency dependent gain may be defined by:

$$\text{gain}(f) = \frac{\sin\left(2\pi f \frac{d}{2c}\right)}{\cos\left(2\pi f \frac{d}{2c}\right)}$$

where f is the frequency of the combined microphone signal, d is the distance between first and second microphones, and c is the speed of sound.

The frequency dependent gain may be applied in the frequency domain. The frequency dependent gain may be applied as part of the Hilbert transform.

The gain adjustment may be adapted in dependence on an input control signal. For example, the gain adjustment may be adapted based on one or more parameters of a camera or video system. The input control signal may be provided from the camera or video system of a host system coupled the camera or video system. The one or more parameters may comprise one or more of: a zoom of a camera and a direction of focus of the camera or video system.

The Hilbert transform may be applied using a finite impulse response, FIR, filter.

According to another aspect of the disclosure, there is provided a non-transitory machine-readable medium storing instructions which, when executed by processing circuitry of an apparatus, cause the apparatus to perform the method as described above.

According to another aspect of the disclosure, there is provided an apparatus of obtaining a directional microphone signal, the apparatus comprising: first and second inputs for receiving first and second microphone signals from first and second microphones separated by a distance; one or more processors configured to: obtain a combined microphone signal based on one or more of the first and second microphone signals; obtain a difference microphone signal by subtracting the second microphone signal from the first microphone signal; obtain a transformed combined microphone signal by applying a Hilbert transform to the combined microphone signal; and combine the transformed combined microphone signal with the difference microphone signal to obtain the directional microphone signal.

Obtaining the combined microphone signal may comprise summing the first and second signals.

The one or more processors may be further configured to apply a delay to the difference microphone signal prior to the combining. The delay may be equal to a delay associated with obtaining the transformed combined signal.

Obtaining the transformed combined microphone signal may further comprise applying a gain adjustment to the combined microphone signal.

Applying the gain adjustment may comprise applying a frequency independent gain to the transformed combined microphone signal. The frequency independent gain may be applied in the time domain.

Applying the gain adjustment may comprise applying a frequency dependent gain. The frequency dependent gain may be defined by:

$$\text{gain}(f) = \frac{\sin\left(2\pi f \frac{d}{2c}\right)}{\cos\left(2\pi f \frac{d}{2c}\right)}$$

where f is the frequency of the combined microphone signal, d is the distance between first and second microphones, and c is the speed of sound.

The frequency dependent gain may be applied in the frequency domain. The frequency dependent gain may be applied as part of the Hilbert transform.

The gain adjustment may be adapted in dependence on an input control signal. For example, the gain adjustment may be adapted based on one or more parameters of a camera or video system. The input control signal may be provided from the camera or video system of a host system coupled the camera or video system. The one or more parameters may comprise one or more of: a zoom of a camera and a direction of focus of the camera or video system.

The one or more processors may implement a finite impulse response, FIR, filter to apply the Hilbert transform.

The apparatus may further comprise an output for outputting the directional microphone signal.

According to another aspect of the disclosure, there is provided a system, comprising: the apparatus described above; and the first and second microphones.

According to another aspect of the disclosure, there is provided an electronic device comprising the apparatus or system described above.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

Figure 1:
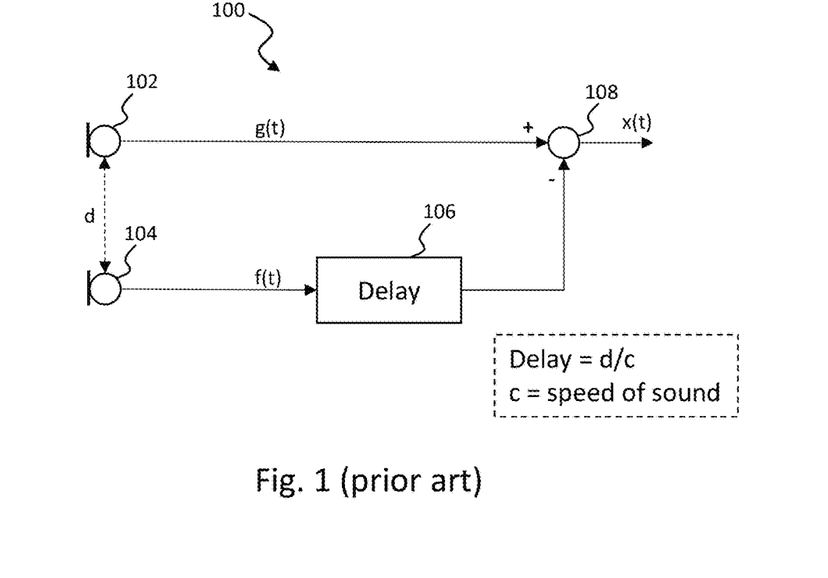
FIG. 1 is a schematic diagram of a directional microphone system according to the prior art.

The architecture of a directional microphone system according to the prior art is illustrated in FIG. 1. First and second (e.g. front and rear) omni-directional microphones 102, 104 generate first and second audio signals g(t), f(t). When a sound wave arrives from a forward direction, it reaches the first microphone 102 first, and hence the second signal f(t) is a delayed version of the first signal g(t). Likewise, if the sound arrives from behind, the first signal 102 is a delayed version of the second signal 104. If the sound arrives from the side, there is no delay between the first and second signal 102, 104. Thus, the delay between the two signals is dependent on the angle of arrival of the sound wave. A delay element 106, coupled to the second microphone 106, is used to match the delay corresponding to the desired cancellation direction. This produces a delayed second signal f'(t). This signal f'(t) is received by a subtractor also coupled to the first microphone 102, configured as shown to output the difference between first signal g(t) and the delayed second signal f'(t) to produce the directional output signal x(t).

To achieve the necessary delay, the delay element 106 is required implement fractional delay approximation when a delay of less than a sample length is required. Such delay may be achieved, for example using a finite impulse response (FIR) filter or an all-pass filter. However, fractional delay approximation is relatively processor intensive when compared to non-fractional delay. Additionally, to steer the direction output signal x(t), (often fractional) delay needs to be applied both to the first and second microphone signals 102, 104, leading to further complexities in implementation.

Embodiments of the present disclosure aim to address or at least ameliorate one or more problems associated with state-of-the-art direction microphone systems by simplifying the processing of microphone signals to obtain steerable directional microphone signals. Embodiments of the present disclosure provide simplified directionality control through the use of Hilbert transforms and gain adjustment. Embodiments of the present disclosure provide improved broadband frequency performance when compared to conventional directional microphone arrays. Embodiments of the present disclosure also provide improvements in beam focus, particularly when combined with known beamforming techniques, such as null beamforming.

Figure 2:
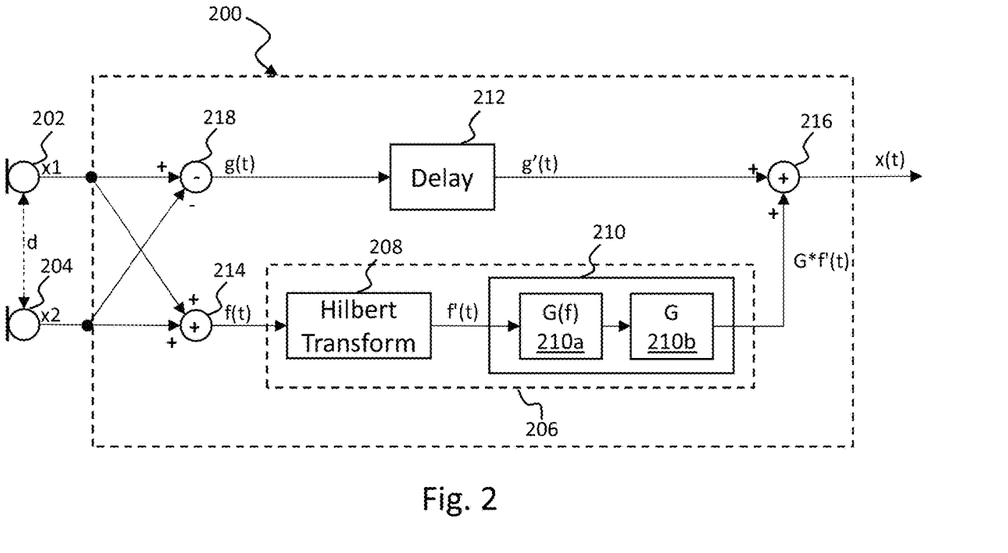
FIG. 2 is a schematic diagram of a directional microphone system according to embodiments of the present disclosure.

FIG. 2 is a schematic diagram of a directional microphone system 200 according to embodiments of the present disclosure. The system 200 is configured to receive first and second microphone signals x1, x2 from first and second microphones 202, 204, which are configured to derive the first and second microphone signal x1, x2 in response to incident sound waves. The system 200 comprises a beamformer module 206 comprising a Hilbert transform module 208 and an optional gain adjustment module 210. The system 200 may further comprise a delay element 212.

The first and second microphone signals x1, x2 are provided to an adder 214 which sums the first and second microphone signals x1, x2 to obtain a combined microphone signal f(t), although in other embodiments the first and second microphone signals x1, x2 may be combined by other means known in the art. The first and second microphone signals x1, x2 are also provided to a subtractor 216 configured to obtain a difference signal g(t) representing a difference between the first microphone signal x1 and the second microphone signal x2.

The combined microphone signal f(t) generated by the adder 214 is provided to the beamformer module 206. In the beamform module 206, the Hilbert transform module 208 is configured to apply a Hilbert transform to the combined microphone signal f(t) thereby generating a transformed combined microphone signal f'(t). The Hilbert transform may be applied in the frequency domain. As such, the beamformer module 206 may be configured to convert signals between the frequency and time domain in a manner known in the art. As will be explained in more detail below, the Hilbert transform imparts a phase shift of 90 degrees to combined microphone signal f(t).

A gain may optionally be applied to the transformed combined microphone signal f'(t) by the gain adjustment module 210. The transformed combined microphone signal f'(t) or a gain adjusted transformed combined microphone signal G*f'(t) is then provided to a second adder 216 for further processing.

Referring again to the subtractor 218, the difference microphone signal g(t) is provided to the delay element 212 which is configured to apply a delay to difference microphone signal g(t) and thus output a delayed difference microphone signal g'(t). The duration of the delay applied by the delay element 212 is set to compensate for the group delay associated with processing by the beamformer module 206 (i.e. group delay due to Hilbert transform), so as to substantially time-align the gain adjusted transformed combined microphone signal G*f'(t) with the (now delayed) difference microphone signal g'(t).

The delayed difference microphone signal g'(t) is then provided to the second adder 216 where it is combined with the gain adjusted transformed combined microphone signal G*f'(t) to obtain a directional microphone signal x(t).

Detailed operation of the beamformer module 206 and the wider system 200 will now be described with reference to FIGS. 3 to 7.

Figure 3:
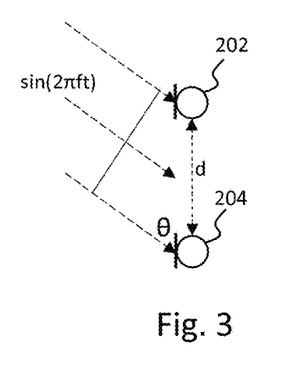
FIG. 3 is a diagram illustrating sound waves incident at the microphones of the system shown in FIG. 2.

FIG. 3 is a diagram showing the first and second microphones 202, 204 which may be configured to generate the first and second microphone signals x1, x2. The first and second microphones 202, 204 are separated by a distance d. The first and second microphones 102, 104 are in the presence of incident sound waves, received at an angle of θ relative to an axis intersecting the first and second microphones 102, 104, from a far-field sound source approximated here as a sinusoid sin(2πft).

In the presence of such sound, the combined microphone signal f(t) and the difference microphone signal g(t) may be approximated as follows.

$$f(t) = \sin(2\pi f(t+\Delta t)) + \sin(2\pi f(t-\Delta t))$$

$$g(t) = \sin(2\pi f(t+\Delta t)) - \sin(2\pi f(t-\Delta t))$$

where $$\Delta t = \frac{d}{2c}\cos(\theta)$$

and c is the speed of sound in air.

Combining the above equations, f(t) and g(t) can be defined as follows.

$$f(t) = 2\sin(2\pi ft)\cos\left(2\pi f\frac{d}{2c}\cos(\theta)\right)$$

$$g(t) = 2\cos(2\pi ft)\sin\left(2\pi f\frac{d}{2c}\cos(\theta)\right)$$

Figure 4:
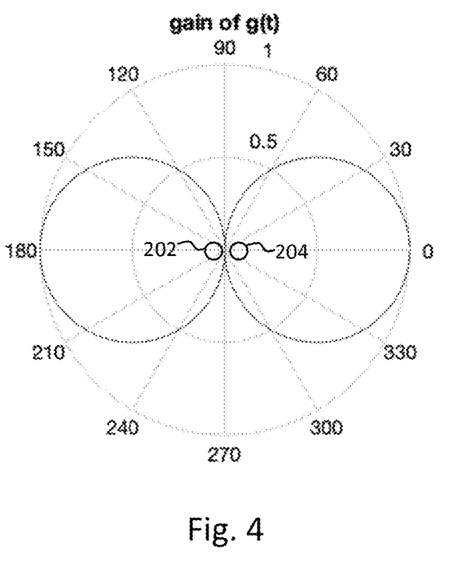
FIGS. 4 and 5 are respective polar plots of a difference microphone signal and combined microphone signal generated by the system of FIG. 2.
Figure 5:
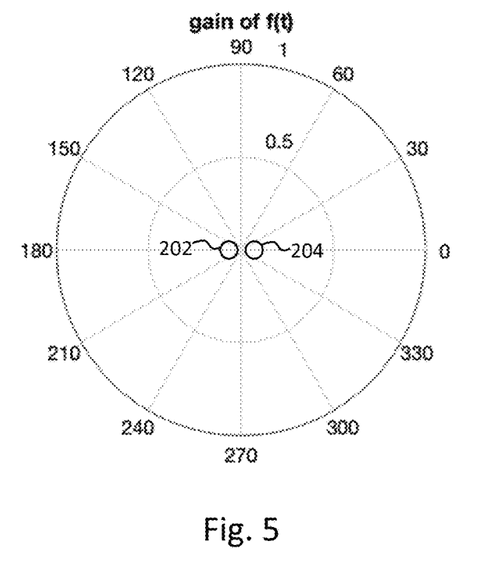

FIGS. 4 and 5 show the beam patterns of the difference microphone signal g(t) and the combined microphone signal f(t) respectively, as approximated by the above equations at a frequency of 400 Hz and a distance d between the first and second microphones 202, 204 of 0.013 m or 1.3 cm. The first and second microphones 202, 204 are overlayed onto the graphs in FIGS. 4 and 5 to illustrate the directionality of the beam patterns of the respective signals f(t), g(t) relative to the position of the microphones 202, 204.

The difference microphone signal g(t) has a bi-directional beam pattern in which sound is suppressed in two directions along a single axis (e.g. front and back or left to right). In contrast, the combined microphone signal f(t) has an omnidirectional beam pattern with no directionality.

By combining the difference microphone signal g(t) and the combined microphone signal f(t), a directional microphone signal can be obtained which is focused in a single direction (e.g. either front or back). However, the difference microphone signal g(t) and the combined microphone signal f(t) are not phase- or magnitude-aligned and so cannot be combined directly. The inventors have devised a novel method of combining the difference and combined microphone signals g(t), f(t) by phase- and magnitude-aligning the signals in a computationally efficient manner to achieve a desirably focussed directional microphone signal x(t).

Specifically, it can also be seen from the above equations that the difference microphone signal g(t) and the combined microphone signal f(t) have a phase difference of 90 degrees (or π/2 rad). As such, referring again to FIG. 2, the combined microphone signal f(t) may be transformed by the Hilbert transform module 210 to obtain a transformed combined signal represented by the following equation, that is substantially in phase with the difference microphone signal g(t). For ease comparison, the difference microphone signal g(t) is also repeated below.

$$f'(t) = 2\sin(2\pi ft)\cos\left(2\pi f\frac{d}{2c}\cos(\theta)\right)$$

$$g(t) = 2\cos(2\pi ft)\sin\left(2\pi f\frac{d}{2c}\cos(\theta)\right)$$

The Hilbert transform shifts the phase or the combined microphone signal f(t) by 90 degrees (i.e. into phase with the difference microphone signal g(t)). The Hilbert transform achieves this shift whilst providing little or no change to the magnitude of the combined microphone signal f(t).

Provided the difference microphone signal g(t) is time-aligned with the transformed combined microphone signal f'(t), these signals will be substantially in phase. To ensure this is the case, the delay element 212 is preferably configured to apply a delay to the difference microphone signal g(t) substantially equal to the delay associated with the Hilbert transform (and any other processing undertaken by the beamformer module 206). This ensures that the signals arriving at the second adder 216 are substantially time-aligned.

With the phase of the delayed difference microphone signal g'(t) and the transformed combined microphone signal f'(t) aligned, gain may be applied to the transformed combined microphone signal f'(t). The gain applied by the gain adjustment module 210 to steer the directional microphone signal x(t). Additionally or alternatively, gain may be applied to align the magnitude of the delayed difference microphone signal g'(t) and the transformed combined microphone signal f'(t). As such, the gain adjustment module 210 may comprise a frequency dependent gain block 210a and a frequency independent gain block 210b. In the example shown, the frequency dependent and frequency independent gain blocks 210*a*, 210*b* are shown separately. In the embodiments, however, these blocks 210*a*, 21*b* may be combined.

The frequency dependent gain block 210*a* is configured to apply a frequency dependent gain configured to align the magnitude of the delayed difference microphone signal g'(t) and the transformed combined microphone signal f'(t). For example, a gain G(f) applied by the frequency dependent gain block 210*a* may be defined as follows.

$$G(f) = \frac{\sin\left(2\pi f \frac{d}{2c}\right)}{\cos\left(2\pi f \frac{d}{2c}\right)}$$

The frequency independent gain block 210*b* is configured to apply a frequency independent (e.g. pure) gain to the transformed combined microphone signal f'(t). For example, the frequency independent gain block 210*b* may be configured to change the direction of the directional microphone signal x(t) by applying a positive gain or a negative gain G. In some embodiments, this gain G may be +1 or −1. In other embodiments the gain G may be a non-unity positive or negative gain in order to steer the beam of the directional microphone signal x(t).

For the following mathematical explanation, the gain applied by the frequency independent gain block 210*b* is either +1 or −1. It will be appreciated, as noted above, that variations may implement non-unity positive or negative frequency independent gain.

The directional microphone signal x(t) may be defined as follows.

$$x(t) = g(t) + G(f) * G * f'(t)$$

$$x(t) = 2\cos(2\pi ft)\left\{\cos\left(2\pi f\frac{d}{2c}\cos(\theta)\right)\frac{\sin\left(2\pi f\frac{d}{2c}\right)}{\cos\left(2\pi f\frac{d}{2c}\right)} \pm \sin\left(2\pi f\frac{d}{2c}\cos(\theta)\right)\right\}$$

$$x(t) = 2\cos(2\pi ft)\left\{\cos\left(2\pi f\frac{d}{2c}\cos(\theta)\right)\sin\left(2\pi f\frac{d}{2c}\right) \pm \sin\left(2\pi f\frac{d}{2c}\cos(\theta)\right)\cos\left(2\pi f\frac{d}{2c}\right)\right\}$$

$$x(t) = 2\cos(2\pi ft)\frac{\sin\left(2\pi f\frac{d}{2c}(1\pm\cos(\theta))\right)}{\cos\left(2\pi f\frac{d}{2c}\right)}$$

In the above equation, the first term (cos(2πft)) represents the phase-delayed input signal (sin(2πft)), and the second term represents the beam gain. It can be seen that the gain can be controlled to adjust both the directionality of the directional microphone signal x(t) and the shape of focus of the directional microphone signal x(t).

In the embodiment shown in FIG. 2, the gain adjustment module 210 is implemented separately from the Hilbert transform module 208. In other embodiments, however, the gain and Hilbert transform may be implemented by a single module.

The directional microphone signal x(t) generated by the system 200 of FIG. 2 has improved broadband frequency performance when compared with state-of-the-art directional beamforming techniques. In other words, the directionality and focus of the directional microphone signal x(t) is substantially maintained over a wider range of frequencies due to the phase- and magnitude-alignment controlled by the beamformer module 206. For example, for a sampling frequency of 48 kHz and a distance d of 13 mm between for the first and second microphones 202, 204, the system 200 is able to generate a relatively high quality directional microphone signal x(t) between 400 Hz and 12 kHz, i.e. substantially over the entire frequency range of human voice.

Figure 6:
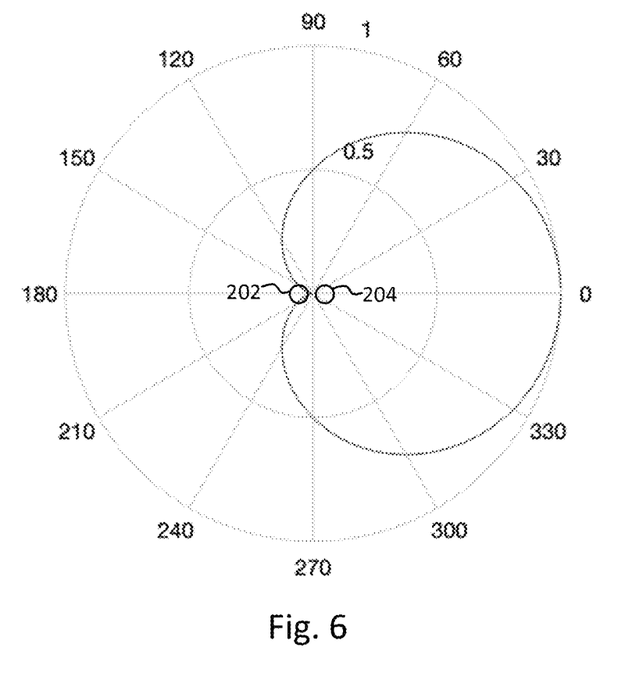
FIGS. 6 and 7 are polar plots of directional microphone signals generated by the system of FIG. 2 under different gain conditions.

FIG. 6 is polar representation of the directional microphone signal x(t), output from the second adder 216 subject to a gain of +1 applied by the gain adjustment module 210 to the transformed combined microphone signal f'(t). The first and second microphones 202, 204 are superimposed on the graph in FIG. 6 to illustrate the directionality of the directional microphone signal x(t) relative to the position of the microphones 202, 204. It can be seen that the directional microphone signal x(t) has a cardioid beam pattern.

Figure 7:
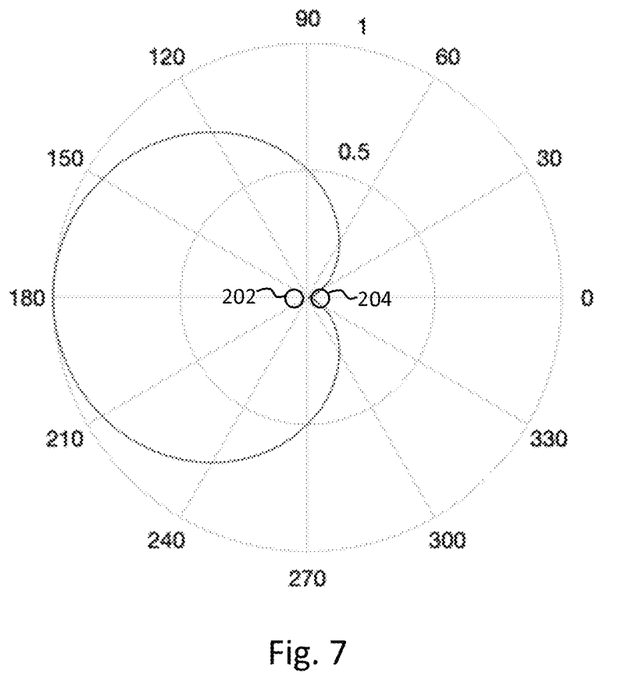

FIG. 7 is a polar representation of the directional microphone signal x(t), output from the adders 216, subject to a gain of −1 applied by the gain adjustment module 210 to the transformed combined microphone signal f'(t). It can be seen that the directional microphone signal x(t) has a cardioid beam pattern which is flipped or rotated by 180 degrees. Thus it can be seen that the direction of focus of the directional microphone signal x(t) can be flipped (or rotated 180 degrees) simply by changing the sign of the gain applied to the transformed combined microphone signal f'(t).

FIGS. 8A to 8D are polar representations of the directional microphone signal x(t) output from the adders 216, subject to gains of 5, 2, 0.5 and 0 respectively, applied by the gain adjustment module 210 to the transformed combined microphone signal f'(t).

Figure 8A:
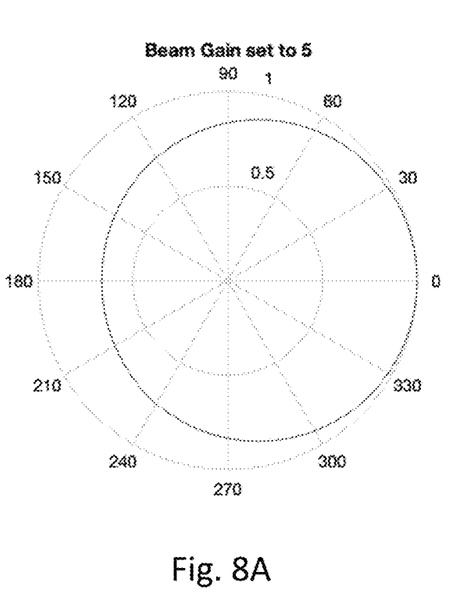
FIGS. 8A, 8B, 8C and 8D are polar plots of directional microphone signals generated by the system of FIG. 2 under different gain conditions.
Figure 8B:
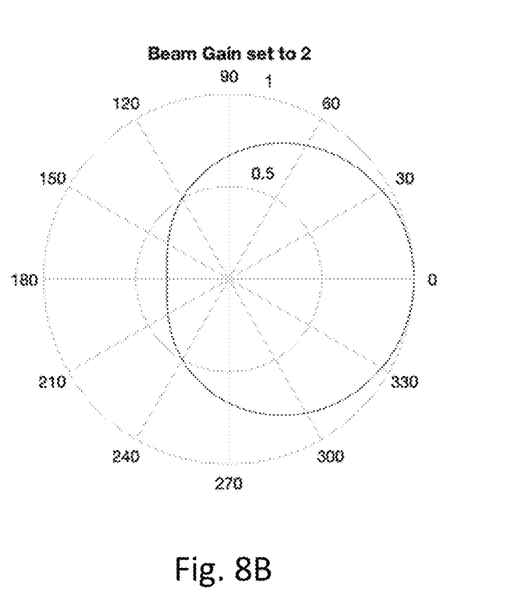
Figure 8C:
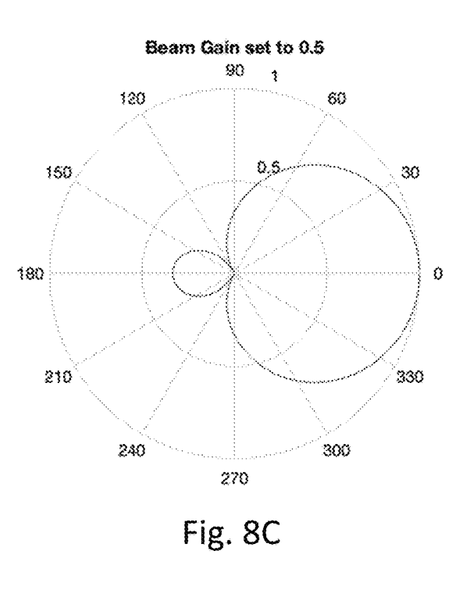
Figure 8D:
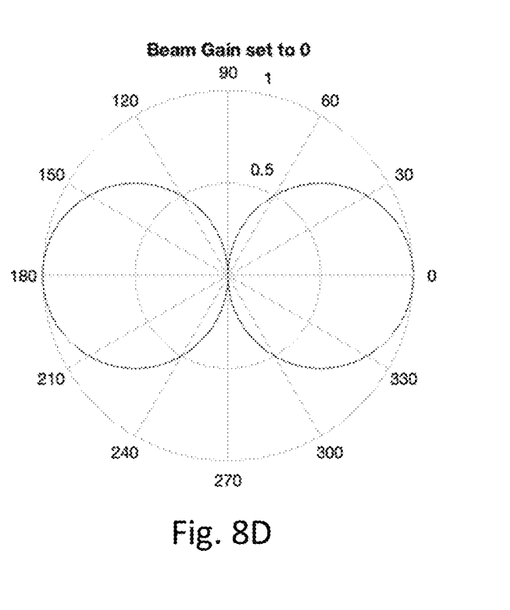

It can be seen from FIGS. 8A and 8B that as the gain is increased to above 1, the cardioid nature of the directional microphone signal x(t) reduces and becomes more omnidirectional. It can also be seen from FIGS. 8C and 8D that as the gain is decreased below 1 and towards zero, the focus of the forward beam increases. However, a second lobe begins to form (FIG. 8C), thereby introducing bidirectionality to the focus of the directional microphone signal x(t).

Figure 9:
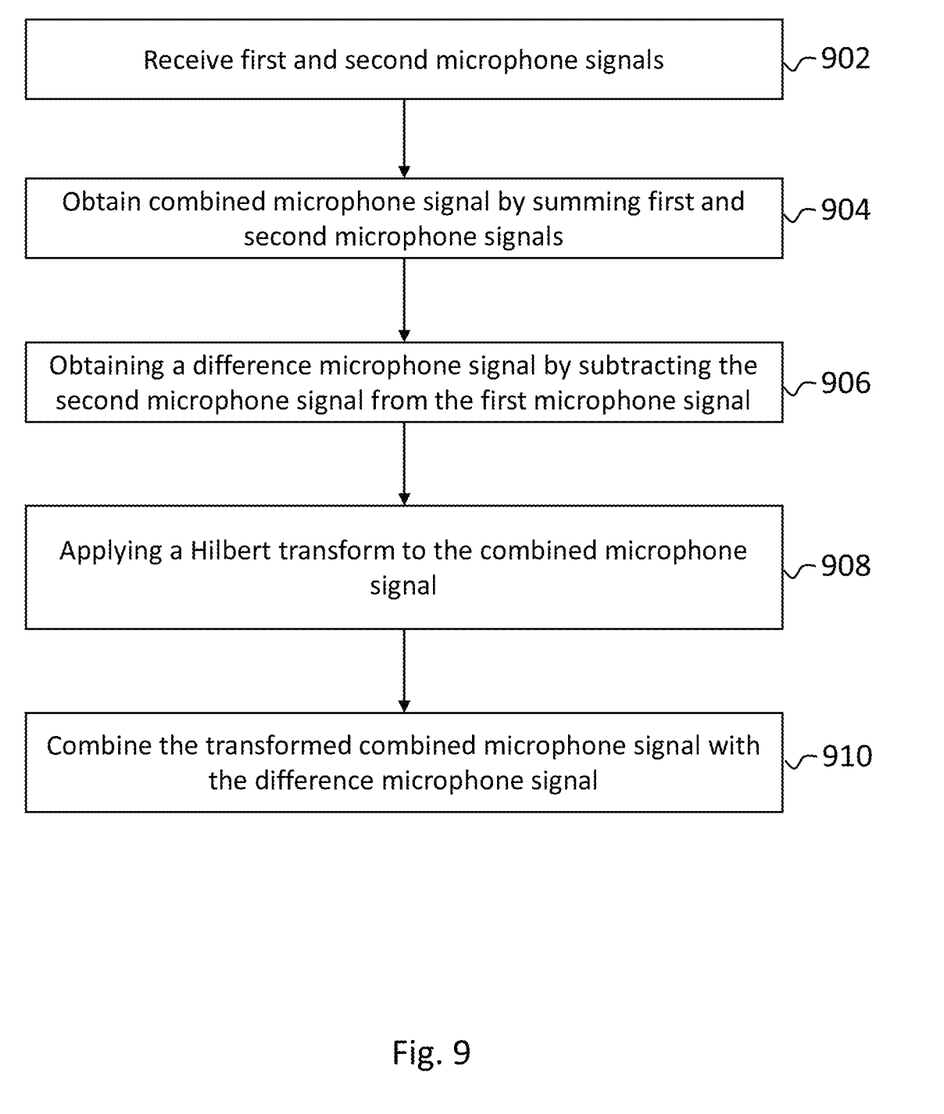
FIG. 9 is a flow diagram illustrating a method according to embodiments of the present disclosure.

Having regard for the above, FIG. 9 is a flow diagram showing a process 900, which may be performed by the system 200 described above, for obtaining the directional microphone signal x(t).

At step 902, the system 200 may receive the first and second microphone signals x1, x2. Such signals may be derived from the first and second microphones 202, 204 or other microphones (not shown).

At step 904, the system 200 may then combine the first and second microphone signals x1, x2, for example by summing or adding the first and second microphone signals together using the adder 214 to obtain a combined microphone signal f(t).

At step 906, the system 200 may obtain the difference microphone signal g(t), for example by determining the difference between the first and second microphone signals x1, x2. This may comprise subtracting the second microphone signal x2 from the first microphone signal x1 at the subtractor 218.

At step 908, the system 200 may apply a Hilbert transform to the combined microphone signal f(t) to obtain the transformed combined microphone signal f'(t). For example, the Hilbert transform module 208 may apply the Hilbert transform. Optionally, a gain adjustment may be applied to the transformed combined microphone signal f'(t). Gain adjustment may comprise applying a frequency-independent gain to the transformed combined microphone signal f'(t) to align the magnitude of the transformed combined microphone signal f'(t) with the delayed difference microphone signal g'(t). This frequency independent gain may apply a non-unity frequency independent gain. Additionally or alternatively, the frequency independent gain may comprise a negative gain.

At step 910, the system 200 may combine the transformed combined microphone signal f'(t) (with gain applied) with the difference microphone signal g(t) to obtain the directional microphone signal x(t).

The gain applied by the gain adjustment module 210 may be applied in the frequency domain, the time domain, or a mixture of both the frequency and time domains. For example, the frequency dependent gain may be applied in the frequency domain. For example, the frequency independent gain, including the change in sign of the transformed combined microphone signal f'(t) (e.g. a gain or +1 or −1) may be implemented in the time domain. It will also be appreciated that whilst the Hilbert transform module 208 and the gain adjustment module 310 are shown in FIG. 2 as separate elements, in other embodiments, one or more functions (or blocks) of the gain adjustment module 210 may be implemented by the Hilbert transform module 208. In any case, one or more of the Hilbert transform module 208 and the gain adjustment module 210 may implement a finite impulse response (FIR) filter or the like to achieve the desired outcome.

It will be appreciated from the above that embodiments of the present disclosure provide a reduction in complexity of processing of microphone signals for directional beamforming with excellent cardioid beam patterns across a large frequency range. However, for some applications, more focused directional beam patterns may be desirable. To achieve such patterns, in some embodiments the directional microphone signal x(t) generated by the system 200 shown in FIG. 2 may be combined with one or more additional beamformed signals to improve the focus of the directional microphone signal x(t). The directional microphone signal x(t) may, for instance, be combined with a null beam pattern to form a more focussed beam pattern.

Figure 10:
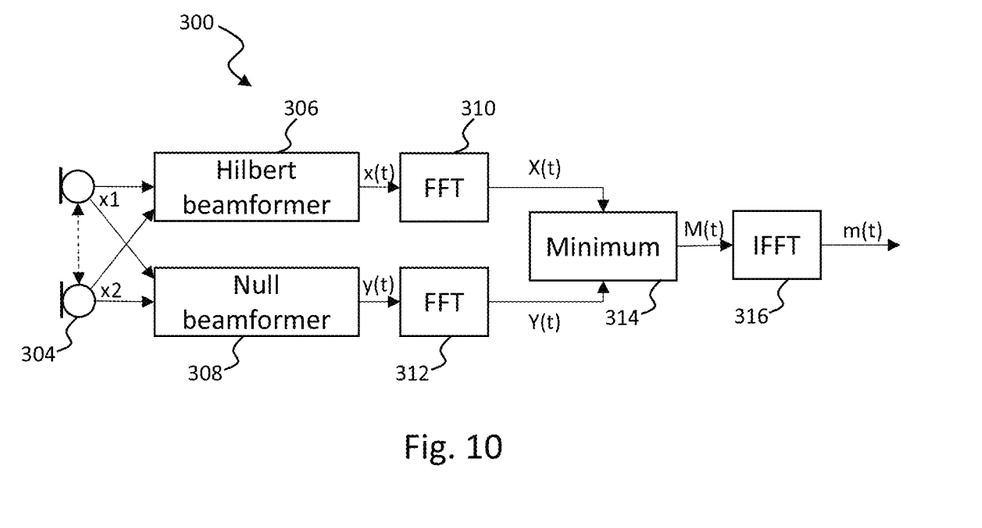
FIG. 10 is a schematic diagram of a directional microphone system according to embodiments of the present disclosure.

FIG. 10 is a schematic diagram of a directional microphone system 300 according to embodiments of the present disclosure. The directional microphone system 300 may receive first and second microphone signals x1, x2 from first and second microphones 302, 304. The system 300 may comprise a Hilbert beamformer 306, a null beamformer 308, first and second fast Fourier transform (FFT) modules 310, 312 a minimum module 314, and an inverse fast Fourier transform (IFFT) module 316.

The Hilbert beamformer 306 may implement the system 200 described above with reference to FIG. 2. The Hilbert beamformer 306 may receive the first and second microphone signals x1, x2 and output a first directional microphone signal x(t) similar to the directional microphone signal x(t) output from the system 200 of FIG. 2.

The null beamformer 308 may be configured to generate a second directional microphones signal y(t) by determining the difference between the first and second microphone signals x1, x2. Null beamforming is known in the art and so will not be described in more detail here. In some embodiments, the difference microphone signal g(t) generated by the subtractor 218 of the system 200 may be used as the second directional microphones signal y(t).

The first and second directional signals x(t), y(t) may then then converted by respective first and second FFT modules 310, 312 into respective frequency domain representations X(t), Y(t) which are provided to the minimum module 314.

The minimum module outputs a minimised signal M(t) representative of the minimum of the two representations X(t), Y(t) in each of a plurality of frequency bins. The minimized signal M(t) is then converted back to the time domain by the IFFT module 316 which outputs a focused directional microphone signal m(t).

Figure 11:
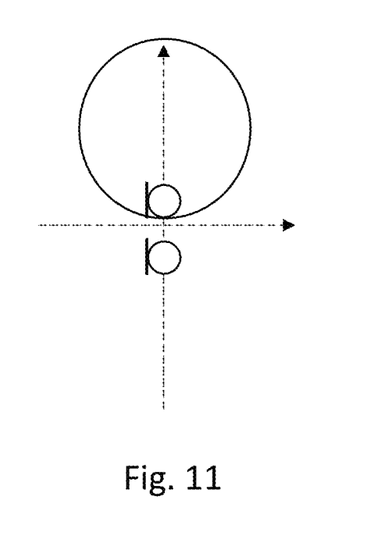
FIGS. 11 and 12 are schematic illustrations of the focus of a focused directional microphone signal obtained by the system shown in FIG. 10 under different gain conditions.
Figure 12:
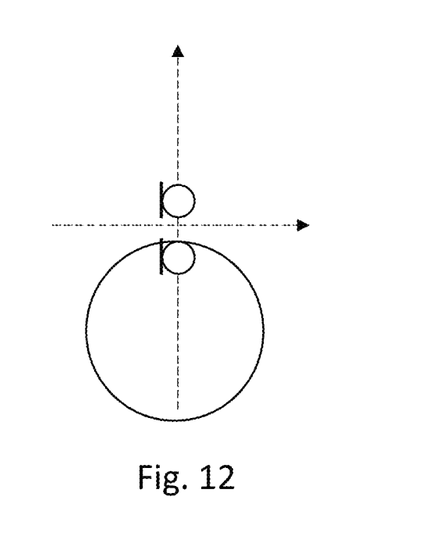

FIGS. 11 and 12 schematically illustrate the focused directional microphone signal m(t) for gains of +1 and −1 implemented by the Hilbert beamformer 306. It can be seen that the beam of the focused directional microphone signal m(t) is more focused in comparison to the directional microphone signal x(t) generated by Hilbert beamforming alone.

Figure 13:
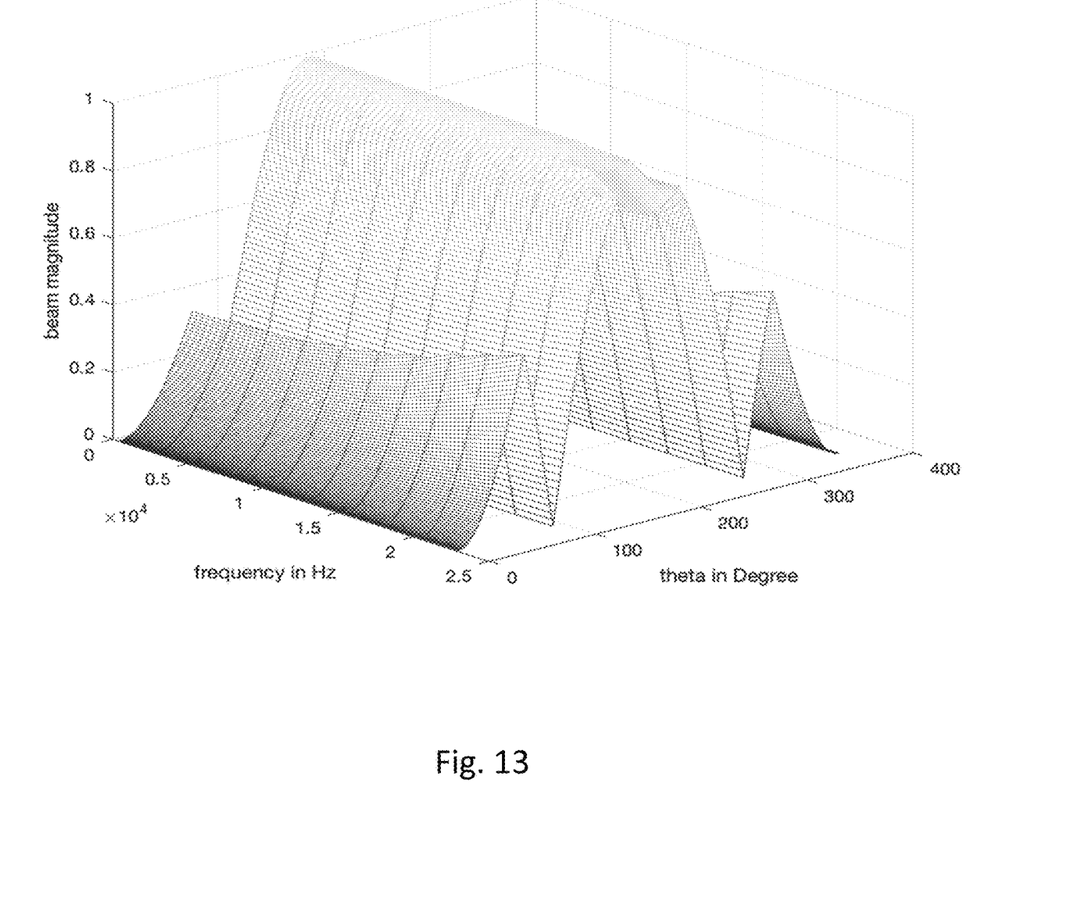
FIG. 13 is a graphical model of a focused directional microphone signal obtained by the system shown in FIG. 10.

FIG. 13 is a three-dimensional graphical model of the focused directional microphone signal m(t) with a gain of +1 implemented by the Hilbert beamformer 306, also showing the narrower focus when compared to a standard cardioid beam pattern.

In the embodiments described above, the systems 200, 300 receive two microphone signals x1, x2 from two microphones 202, 204. Embodiments of the present disclosure are not, however, limited to the processing of two microphone signals. The embodiments described herein may be expanded to accommodate beamforming based on three or more microphone signals.

Figure 14:
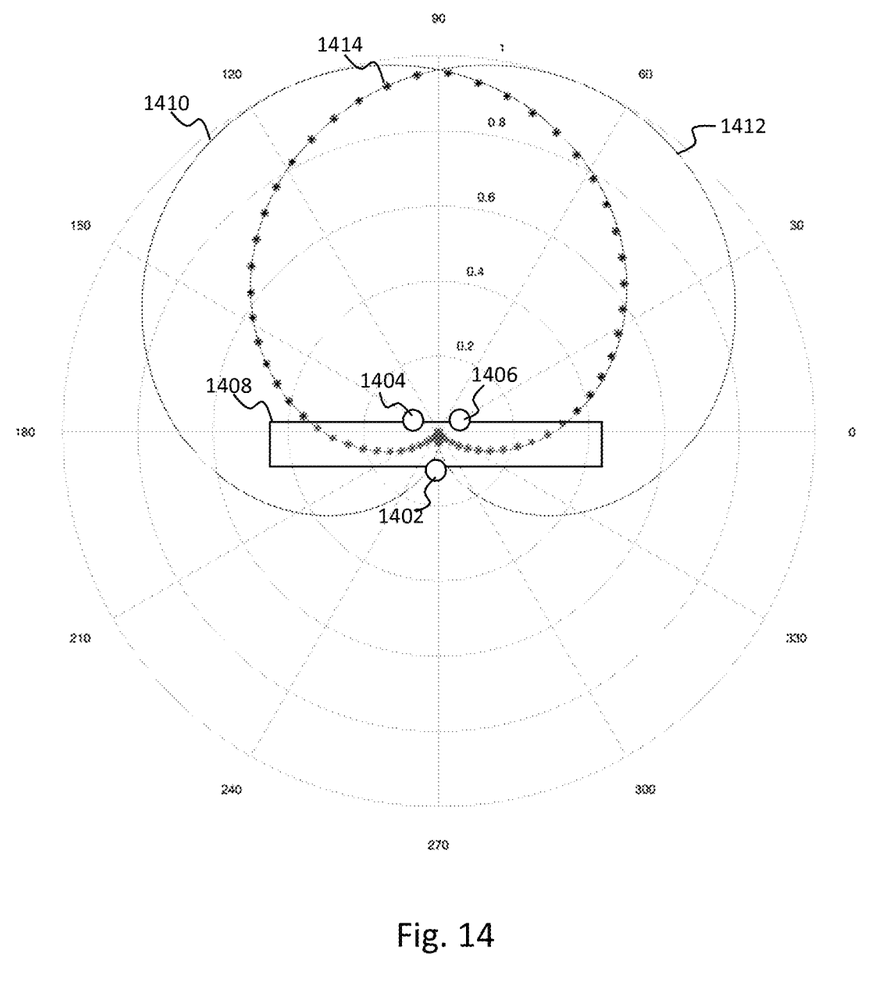
FIG. 14 is a polar representation of a pair of directional microphone signals derived from three microphones according to embodiments of the present disclosure.

FIG. 14 is a polar representation of a pair of directional microphone signals derived from first, second and third microphones 1402, 1404, 1406 which may be integrated into a device 1408, such as a smartphone. A first directional microphone signal 1410 is derived from microphone signals generate by the first and second microphones 1402, 1404. A second directional signal 1412 is derived from microphone signals generated by the first and third microphones 1404, 1406. The first and second directional microphone signals 1410, 1412 combine to provide a focused beam denoted in FIG. 14 by stared line 1414.

The system 200 of FIG. 2 and/or the system 300 of FIG. 10 may be integrated into (or be associated with) a device such as a smartphone or tablet or other device comprising a plurality of microphones. In any such case, gain adjustment, for example applied by the gain adjustment module 210, may be controlled based on one or more external inputs. For example, where the system 200 or the system 300 is implemented in a mobile device comprising one or more cameras, the gain G may be controlled based on the camera being used to capture video. For example, the system 200 or the system 300 may be implemented in a device (e.g. smartphone or tablet) (not shown) comprising front and rear cameras. Depending on whether video is being captured by the front or rear camera of the device, the gain adjustment module 210 or the Hilbert beamformer 306 may apply a positive or negative gain to focus the directional microphone signal x(t) to the front or the rear of the device, i.e. towards the field of view of the camera being used. Additionally or alternatively, the gain G may be controlled based on a zoom of a camera of a device into which the system 200 or the system 300 is integrated or with which the system 200 or the system 300 is associated. For example, as the camera zooms in or out, the gain G may be controlled to adjust (narrow or widen) the focus of the directional microphone signal x(t). In another example, in the system 300, as the camera zooms in or out, the combining of the first and second directional microphone signals (t), y(t) may be adapted to adjust the focus of the focused directional microphone signal m(t) to match the zoom level of the camera.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the terms module and block shall be used to refer to a functional unit or block which may be implemented at least partly by dedicated hardware components such as custom defined circuitry and/or at least partly be implemented by one or more software processors or appropriate code running on a suitable general purpose processor or the like. A module or block may itself comprise other modules, blocks, or functional units. A module or block may be provided by multiple components or sub-modules or sub-blocks which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A method of obtaining a directional microphone signal, the method comprising:
receiving first and second microphone signals from first and second microphones separated by a distance;
obtaining a combined microphone signal by combining the first and second microphone signals;
obtaining a difference microphone signal by subtracting the second microphone signal from the first microphone signal;
obtaining a transformed combined microphone signal by applying a Hilbert transform to the combined microphone signal;
combining the transformed combined microphone signal with the difference microphone signal to obtain the directional microphone signal.

2. The method of claim 1, wherein obtaining the combined microphone signal comprises:
summing the first and second signals.

3. The method of claim 1, further comprising:
applying a delay to the difference microphone signal prior to the combining.

4. The method of claim 3, wherein the delay is equal to a delay associated with obtaining the transformed combined signal.

5. The method of claim 1, wherein obtaining the transformed combined microphone signal further comprises applying a gain adjustment to the combined microphone signal.

6. The method of claim 5, where applying the gain adjustment comprises:
applying a frequency independent gain to the transformed combined microphone signal.

7. The method of claim 6, wherein frequency independent gain is applied in the time domain.

8. The method of claim 5, wherein applying the gain adjustment comprises applying a frequency dependent gain.

9. The method of claim 8, wherein the frequency dependent gain is defined by:

$$\text{gain}(f) = \frac{\sin\left(2\pi f \frac{d}{2c}\right)}{\cos\left(2\pi f \frac{d}{2c}\right)}$$

where f is the frequency of the combined microphone signal, d is the distance between first and second microphones, and c is the speed of sound.

10. The method of claim 8, wherein the frequency dependent gain is applied in the frequency domain.

11. The method of claim 8, wherein the frequency dependent gain is applied as part of the Hilbert transform.

12. The method of claim 5, wherein the gain adjustment is adapted in dependence on an input control signal.

13. The method of claim 5, wherein the gain adjustment is adapted based on one or more parameters of a camera or video system.

14. The method of claim 13, wherein the one or more parameters comprise one or more of: a zoom of a camera and a direction of focus of the camera or video system.

15. The method of claim 1, wherein the Hilbert transform is applied using a finite impulse response, FIR, filter.

16. A non-transitory machine-readable medium storing instructions which, when executed by processing circuitry of an apparatus, cause the apparatus to perform the method comprising:
receiving first and second microphone signals from first and second microphones separated by a distance;
obtaining a combined microphone signal by combining the first and second microphone signals;
obtaining a difference microphone signal by subtracting the second microphone signal from the first microphone signal;
obtaining a transformed combined microphone signal by applying a Hilbert transform to the combined microphone signal;
combining the transformed combined microphone signal with the difference microphone signal to obtain the directional microphone signal.

17. An apparatus of obtaining a directional microphone signal, the apparatus comprising:
first and second inputs for receiving first and second microphone signals from first and second microphones separated by a distance;
one or more processors configured to:
obtain a combined microphone signal by combining the first and second microphone signals;
obtain a difference microphone signal by subtracting the second microphone signal from the first microphone signal;
obtain a transformed combined microphone signal by applying a Hilbert transform to the combined microphone signal; and
combine the transformed combined microphone signal with the difference microphone signal to obtain the directional microphone signal.

18. The apparatus of claim 17, further comprising:
an output for outputting the directional microphone signal.

19. A system, comprising:
the apparatus of claim 17; and
the first and second microphones.

20. An electronic device comprising the apparatus of claim 19.

* * * * *

UNITED STATES PATENT AND TRADEMARK OFFICE
CERTIFICATE OF CORRECTION

PATENT NO. : 11,477,569 B2
APPLICATION NO. : 17/205352
DATED : October 18, 2022
INVENTOR(S) : Zhou et al.

Page 1 of 2

It is certified that error appears in the above-identified patent and that said Letters Patent is hereby corrected as shown below:

In the Specification

1. In Column 2, Line 19, delete "the" and insert -- to the --, therefor.

2. In Column 3, Line 11, delete "the" and insert -- to the --, therefor.

3. In Column 4, Lines 11-12, delete "second microphone 106," and insert -- second microphone 104, --, therefor.

4. In Column 4, Line 20, delete "required" and insert -- required to --, therefor.

5. In Column 4, Line 58, delete "subtractor 216" and insert -- subtractor 218 --, therefor.

6. In Column 6, Line 22, delete "focussed" and insert -- focused --, therefor.

7. In Column 6, Lines 27-28, delete "Hilbert transform module 210" and insert -- Hilbert transform module 208 --, therefor.

8. In Column 6, Line 31, delete "ease" and insert -- easy --, therefor.

9. In Column 6, Lines 35-40, delete "
$$f'(t) = 2\sin(2\pi ft)\cos\left(2\pi f \frac{d}{2c}\cos(\theta)\right)$$
$$g(t) = 2\cos(2\pi ft)\sin\left(2\pi f \frac{d}{2c}\cos(\theta)\right)$$
" and insert Signed and Sealed this
Fourteenth Day of February, 2023

*Katherine Kelly Vidal*

Katherine Kelly Vidal
*Director of the United States Patent and Trademark Office*

$$f'(t) = 2\cos(2\pi ft)\cos(2\pi f\frac{d}{2c}\cos(\theta))$$

$$g(t) = 2\cos(2\pi ft)\sin(2\pi f\frac{d}{2c}\cos(\theta))$$

--, therefor.

10. In Column 7, Line 2, delete "blocks 210a, 21b" and insert -- blocks 210a, 210b --, therefor.

11. In Column 8, Line 3, delete "between for" and insert -- between --, therefor.

12. In Column 8, Lines 33-40, delete "It can be seen from FIGS. 8A and 8B that......focus of the directional microphone signal x(t)." and insert the same at Line 32, after "f' (t)." as a continuation paragraph.

13. In Column 9, Line 20, delete "gain adjustment module 310" and insert -- gain adjustment module 210 --, therefor.

14. In Column 9, Line 40, delete "focussed" and insert -- focused --, therefor.

15. In Column 10, Line 31, delete "generate" and insert -- generated --, therefor.

16. In Column 10, Line 33, delete "first and third microphones 1404," and insert -- first and third microphones 1402, --, therefor.

In the Claims

17. In Column 13, Lines 4-5, in Claim 4, delete "a delay" and insert -- the delay --, therefor.

18. In Column 13, Line 41, in Claim 14, delete "a camera" and insert -- the camera --, therefor.

19. In Column 14, Lines 17-18, in Claim 16, delete "the directional microphone signal." and insert -- a directional microphone signal. --, therefor.